Patented Apr. 26, 1938

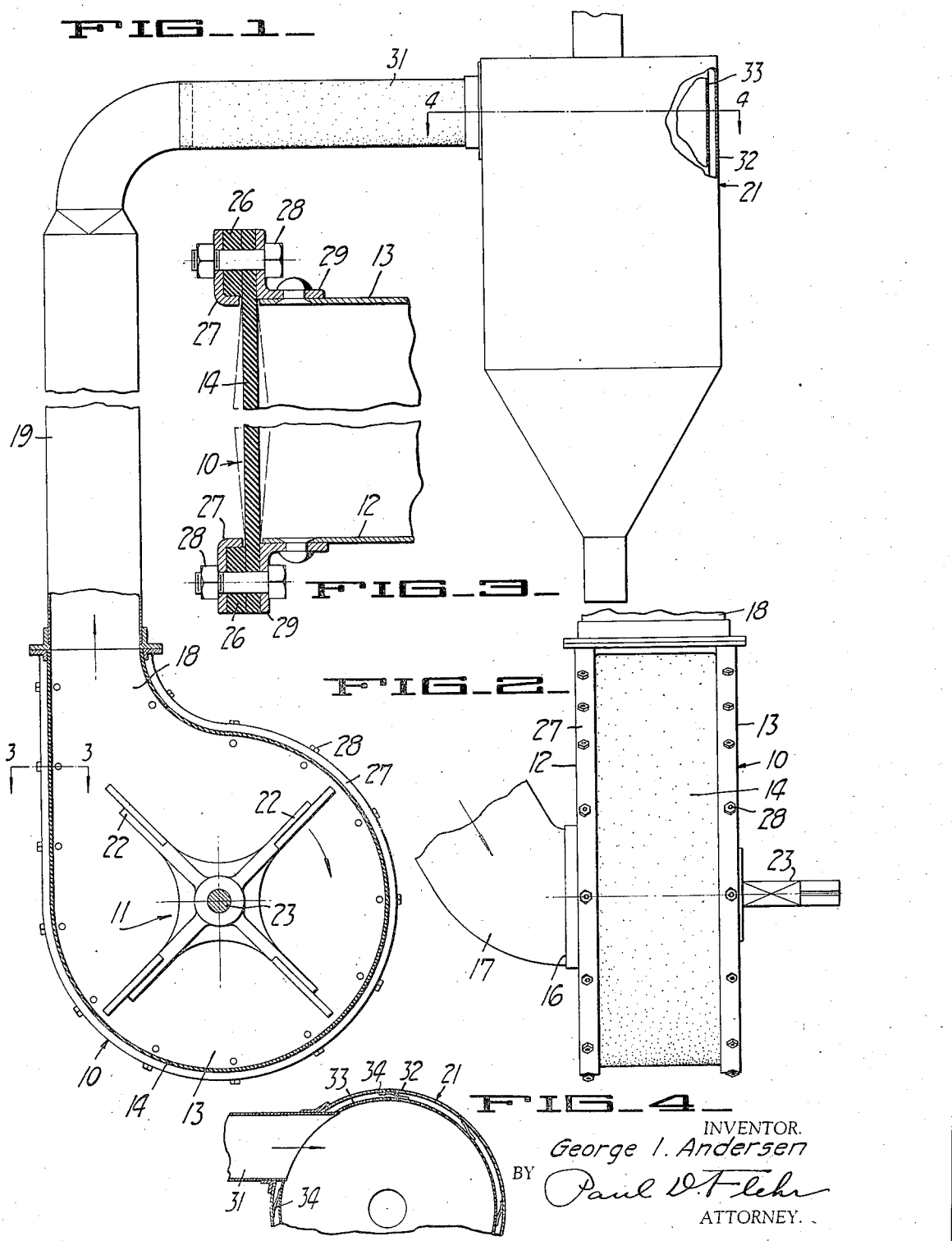

2,115,134

UNITED STATES PATENT OFFICE 2,115,134

DISINTEGRATING MACHINE

George I. Andersen, San Francisco, Calif., assignor to Andersen-Smith Milling Co., San Francisco, Calif., a corporation of California Application February 14, 1936, Serial No. 63,936

5 Claims. (Cl. 83—11)

This invention relates generally to machines for the disintegration of solid materials. It has particular application for handling material tending to cling to surfaces upon which it is impacted, as for example feed mixtures containing molasses or like ingredients.

It has been common in the past to employ machines similar an ordinary centrifugal blower, through which material to be disintegrated is passed, together with a current of air. In such machines, the material is disintegrated by impact with the vanes of the impeller and by impact with the peripheral walls of the blower housing. I have found that machines of this type are subject to serious clogging if operated upon mixtures containing a relatively high percentage of molasses, as for example a mixture containing bone meal and molasses, where the molasses content is in the neighborhood of 40% by weight. Clogging is caused by plastering and building up of material upon the inner peripheral walls surrounding the impeller.

It is an object of the present invention to provide a machine which will overcome the above difficulty, and which will make possible the manufacture of finely divided products in which a relatively high percentage of an ingredient like molasses, is homogeneously dispersed.

Further objects of the invention will appear from the following description in which the preferred embodiment of the invention has been set forth in detail, in conjunction with the accompanying drawing.

Referring to the drawing:

Fig. 1 is a side elevational view, partly in cross-section, illustrating a machine incorporating the present invention.

Fig. 2 is a side elevational view, illustrating a part of the machine shown in Fig. 1.

Fig. 3 is a cross-sectional detail taken along the line 3—3 of Fig. 1.

Fig. 4 is a cross-sectional view taken along the line 4—4 of Fig. 1.

The machine illustrated consists of a housing 10, serving to enclose a rotary impeller 11. The housing is formed by side walls 12 and 13, together with the curved peripheral walls 14. One side of the housing is shown provided with an inlet opening 16, connected to the feed conduit 17. The peripheral walls 14 are interrupted by the outlet opening 18, which is shown connected with the discharge conduit 19. This discharge conduit is arranged vertically, and has its upper end connected to the cyclone separator 21.

The comparatively simple form of impeller 11 illustrated, consists of circumferentially spaced blades or vanes 22, carried upon the rotatable shaft 23. The shaft is journaled, and is adapted to be driven at a relatively high speed, as for example a speed in the neighborhood of 3600 revolutions per minute.

The side walls 12 and 13 of the housing can be of rigid construction, and are conveniently formed of sheet metal. The peripheral walls 14 however are formed of flexible resilient material, capable of vibrating laterally. Thus as shown in Fig. 3, the peripheral walls are formed of a sheet of flexible resilient rubber, as for example relatively pure rubber stock having no fabric reinforcing. To facilitate attaching and properly anchoring the marginal edges of the rubber sheet to the side walls 12 and 13, additional strips 26 of rubber, are shown cemented or vulcanized to the edges of the rubber sheet, and these strips are shown being engaged by the metal angle strips 27. Bolts 28, or like means, pass through the angle strips 27 and the marginal edges of the rubber strip, to effect a secure attachment to the angles 29 riveted to edges of the side walls 12 and 13.

Operation of the machine described above can be explained as follows:—With the impeller 11 in operation, turbulent air currents are set up within the housing, which cause rapid and continual lateral vibration of the peripheral side walls 14. This lateral vibration is permitted by virtue of the resilient character of the rubber sheet, which alternately stretches and contracts during the vibration. Now as the material to be disintegrated is fed through the conduit 17, together with a stream of air, it passes into the zone of operation of the vanes 22, and is caused to impact at high velocity with the inner surfaces of the side walls 14. Such impacting of material against the side walls causes additional lateral vibration, and as a result of such vibratory movements, together with alternate stretching and contraction, the material can not adhere to or build up on the inner surfaces of the rubber sheet. Material of proper fineness is conveyed upwardly through the discharge conduit 19, into the cyclone separator 21. Larger lumps of material, which have not been reduced to proper fineness, are not conveyed into the cyclone through the discharge conduit, and therefore are returned to the zone of operation, for further disintegration.

The rubber sheet forming the peripheral side walls should of course be of sufficient thickness and strength to withstand the internal pressure to which it is subjected, without however being of such thickness and weight as to impair the desired vibratory action. By way of example, a rubber sheet about one-fourth inch in thickness and about eleven inches wide, has given good results.

In addition to using a vibratable sheet in a disintegrating machine, like means can be incorporated in the cyclone separator 21. Thus as shown in Figs. 1 and 4 the conduit section 31 which discharges into the cyclone can be of resilient flexible rubber, and the metal walls 32 of the main cyclone chamber, can be provided with a liner 33 of resilient flexible rubber. This liner is shown retained by yieldable spacer elements 34, so that it may vibrate laterally to prevent solid material from adhering to its inner surface.

My machine will successfully handle feed mixture of the character previously mentioned, containing a relatively high percentage of molasses. In forming a product containing bone meal and molasses, these ingredients, together with any additional ingredients desired, are first premixed in a suitable mixer, such as one of the rotary drum type, and this mixture is then supplied through the conduit 17 at a suitable rate. In passing through my machine sticky lumps are largely eliminated, and a more uniform distribution of the molasses through the bone meal, is produced. The disintegrated product withdrawn from the cyclone separator 21, need only be screened, to form the final product for sacking. The small amount of oversized particles removed in the screening operation, can be returned to the process.

I claim:

1. In a machine of the character described for the disintegration of solid materials, a rotary impeller having spaced vanes, means for feeding material to be disintegrated to the zone of operation of the impeller, a sheet of flexible and resilient material forming a laterally vibratable wall encompassing the zone of operation of the impeller, said wall being vibratable by turbulent currents of air induced by the impeller and by impact of solid material upon the same, and means engaging the longitudinal edges of the sheet for supporting the same, the area between the edges of the sheet being substantially unsupported and free to vibrate laterally.

2. In a machine of the character described for the disintegration of solid materials, a rotary impeller having spaced vanes, means for feeding material to be disintegrated to the zone of operation of the impeller, a sheet of flexible and resilient rubber forming a laterally vibratable wall encompassing the zone of operation of the impeller, said wall being vibrated by turbulent currents of air induced by the impeller and by impact of solid material upon the same, the general direction of vibration being substantially at right angles to the axis of rotation of the impeller, and means engaging the longitudinal side edges of the sheet for supporting the same, the area between the edges of the sheet being substantially unsupported and free to vibrate laterally.

3. In a machine of the character described for the disintegration of solid materials, a housing including spaced side walls and peripheral walls connecting the side walls, said housing having an inlet in one of the side walls for receiving material to be disintegrated, and also having an outlet interrupting the peripheral walls, a rotary impeller disposed within the housing, the impeller having circumferentially spaced vanes and serving when rotated to draw air into the housing through said inlet and discharge the same through the outlet, the peripheral walls of the housing being laterally vibratable and formed substantially entirely of flexible and resilient material.

4. In a machine of the character described for the disintegration of solid materials, a housing including spaced side walls and peripheral walls connecting the side walls, said housing having an inlet in one of the side walls and also having an outlet interrupting the peripheral walls, a rotary impeller disposed within the housing, the impeller having circumferentially spaced vanes and serving when rotated to draw air into the housing together with material to be disintegrated, and to discharge air and disintegrated material through the outlet, at least a part of the peripheral walls of the housing being formed of a vibratable sheet of flexible and resilient rubber, said sheet having its side edges attached to the adjacent edges of the side walls but having its major area free to vibrate in a direction laterally of the same.

5. In a machine of the character described for the disintegration of solid materials, a housing including spaced side walls and peripheral walls connecting the side walls, said housing having an inlet in one of said side walls and an outlet interrupting the peripheral walls, a vertical discharge conduit communicating with the outlet, a rotary impeller disposed within the housing, the impeller having circumferentially spaced vanes and serving when rotated to draw air together with solid material to be disintegrated into said housing and to discharge disintegrated material and air through the outlet, the peripheral walls of the housing being formed of a sheet of flexible and resilient rubber, said sheet of rubber having its side edges anchored to said side walls but being otherwise free to vibrate laterally when the machine is in operation.

GEORGE I. ANDERSEN.